March 11, 1952     H. J. FINDLEY     2,588,507
HEATER BOOSTER BRAKE
Filed Nov. 12, 1948
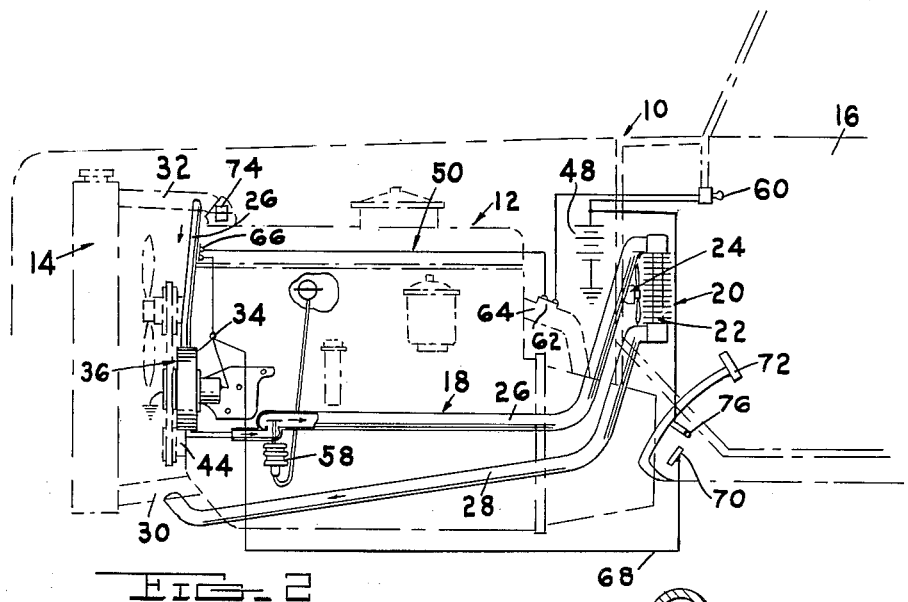
INVENTOR.
HOWARD J. FINDLEY
BY
ATTORNEYS Patented Mar. 11, 1952

2,588,507

UNITED STATES PATENT OFFICE 2,588,507

HEATER BOOSTER BRAKE

Howard J. Findley, Chardon, Ohio, assignor to Eaton Manufacturing Company, Cleveland, Ohio, a corporation of Ohio Application November 12, 1948, Serial No. 59,547

10 Claims. (Cl. 237—8)

This invention relates to heaters and more particularly to heaters for heating the passenger compartment of automotive vehicles and the like.

Broadly the invention comprehends the provision of a liquid heating system for heating the passenger compartment of automotive vehicles having incorporated therein mechanical-electrical energy heat producing means providing for quick warm-up of the liquid circulated through the heating system.

An object of the invention is the provision of a quick warm up heater booster for conventional automotive passenger compartment water heating systems.

Another object is the provision of a mechanical-electrical energy heat producing device adapted to be incorporated in the liquid circulating system of a heater for automotive vehicles for providing a quick delivery of heat from the heater shortly after the vehicle engine is started.

Another object of the invention is the provision of an efficient type of electrical drive utilized as a means for the transformation of mechanical energy into electrical energy thence into heat in association with the liquid circulating system of conventional automotive heaters for quick warm up of the heater liquid.

A further object of the invention is the provision of an eddy current or similar power transmitting mechanism utilized as a brake and associated with an automotive liquid heater wherein the electrical energy generated therein is instantaneously transformed into heat for immediate heating of the liquid delivered to the heater.

A yet further object of the invention is the provision of an electrical device driven from an automotive vehicle engine for initially and quickly boosting the temperature of the liquid to be delivered to a conventional liquid heater for the vehicle, said booster to be operative only until such time as the liquid in the vehicle engine normally attains a predetermined temperature.

A still further object of the invention is the provision of an eddy current or similar power absorption or brake mechanism driven from a liquid cooled engine and associated with a conventional liquid heater system connected with the circulating cooling system of the engine adapted to be energized when the temperature is below a predetermined figure for quickly and effectively raising the temperature in the heater system and having appropriate controls for limiting its operation relative to the heater system and also being controllable for operation from the brake pedal of the vehicle for loading the engine and thus retarding the engine operation as a supplementing medium to the conventional braking apparatus of the vehicle.

And yet a further object of the invention is the provision of a vehicle engine driven combination heat production and power absorption device in association with a liquid heater system for the vehicle, said heater system in turn having liquid connection with the engine cooling system, said device being effective to provide quick heat for the heater system, assist in the braking of the vehicle and maintain the cooling system liquid at desirable temperatures so as to prevent crankcase dilution and provide for better engine operation generally.

Other objects and advantages of the invention will appear from the following description taken in connection with the drawings, forming a part of the specification; and in which:

Fig. 1 is a diagrammatic illustration of a heater booster, constituting the basis of the invention and the liquid heater system and liquid cooled en ine with which it is associated;

Fig. 2 is a vertical cross-sectional view of an eddy current electromagnetic brake constituting the heater booster of Fig. 1; and Fig. 3 is a fragmentary cross-sectionalized view of the electrical switch and liquid controls for the booster.

This invention is directed at the provision of means operative as a supplement to a conventional liquid heater for heating the passenger compartment of vehicle for the purpose of providing a quick warm up of the liquid delivered to the heater shortly after the starting of the vehicle engine and prior to the time that the vehicle engine has an opportunity to normally heat up the liquid in its circulating system which is normally supplied to the heater. The supplemental heater means is herein defined as a heater booster or quick warm up device and is in the form of an eddy current electroma n tic power absorption device or brake having a pair of members one rotatable relative to the other which through the controlled inducement of electr cal energy between the members the energy is transformed into heat, said heat in turn being extracted therefrom by the liquid to be circulated through the vehicle heater for the quick warm up thereof. The heater booster is preferably driven by an output source of the vehicle engine and is contro led for operation by a thermostat switch arranged in the heater liquid system at the inlet to a liquid jacket arranged on a stationary member of the brake for controlling an electrical circuit for supplying current to the electromagnetic coil of the brake. This switch is normally in "on" position as it is adapted to be actuated upon a predetermined heat attainment in the heater liquid system and is in circuit with the engine ignition switch such that upon turning on the ignition switch the coil is immediately energized. After the engine is started, the rotor of the electromagnetic drive is driven thereby causing relative rotation between the rotor and the stationary member thereof; and with the energization of the electromagnetic coil, eddy currents will be produced between the rotor and stationary member.

Another thermostat switch can be provided in the electrical circuit in series with the ignition switch and first thermostat switch if it is desired to inhibit operation of the device until the engine has been sufficiently warmed up, and this switch is positioned in the exhaust manifold in normally "off" position until the heat in the manifold reaches a predetermined temperature at which time it will be actuated to "on" position permitting of the delivery of current to the coil of the electromagnetic device. The thermostat switch located adjacent to the inlet of liquid to the jacket around the stationary member of the brake remains on providing for continual delivery of electrical current to the coil; but after a predetermined increased temperature is attained in the heater liquid, said switch is actuated to break the circuit thus inhibiting delivery of current to the coil of the brake and the subsequent production of eddy currents. A thermostatically operated liquid control valve is preferably arranged in the outlet of the water circulating system associated with the brake for controlling the delivery of liquid heated to a predetermined degree to the heater proper.

The heater booster in being in the form of an eddy current electromagnetic power absorption mechanism or brake for the basic purpose of providing an efficient means of producing quick heat for a limited amount of water can be further utilized in its true sense as a power absorption unit or brake for the vehicle by providing a secondary electrical circuit controlled as by the conventional brake pedal of the vehicle, said braking operation imposing a load on the engine through the drive means therefrom associated with the input to the brake.

Referring to the drawings for more specific details of the invention, 10 represents generally an automotive vehicle comprising an engine 12, a radiator 14 for the engine, a passenger compartment 16, and a passenger compartment liquid heating system designated generally by numeral 18.

The liquid heating system comprises a conventional liquid heater 20 consisting of a liquid circulating core 22 and an air circulating fan 24 adapted to circulate air over and through air passages in the core for the delivey of heated air to passenger compartment 16 in which the heater is located. The heater core is connected to the liquid circulatory system of the engine by inlet and outlet conduits 26 and 28 respectively, conduit 28 being connected to the outlet connecting hose 30 between the engine and radiator whereas conduit 26 is connected to inlet hose 32 arranged between the radiator and engine with the liquid circulating system of heater booster 34 interposed intermediate thereof between the hose 32 and heater core 22.

The heater booster is in the form of an eddy current electromagnetic power absorption unit or brake 36 comprising a rotor 38 and a stationary drum member 40 appropriately mounted upon the engine block or other suitable place. The rotor 38 is connected to a pulley 42 having belt driven connection with an output shaft 44 of the engine such as a crankshaft or the like. An electromagnetic coil 46 is securely mounted in the rotor and is supplied current from a suitable source of power such as a battery 48 through an electrical circuit 50 controlled as by suitable mechanism that will be hereinafter defined. The heater booster although specifically illustrated as being of the eddy current type of electromagnetic power transmitting device could equally as well be of the permanent magnet variety or any of several recently developed forms of magnetic or magnetic power transmitting devices.

The power absorption device 36 is of the type of electromagnetic power transmitting mechanism disclosed by Patent No. 2,367,636, issued to M. Winther, January 16, 1945, wherein eddy currents are induced between the respective rotor and drum members upon relative rotation therebetween and energization of the electromagnetic coil.

The drum member 40 is encased by jacket 52 which has inlet connection 54 with conduit 26 of the heater on the inlet hose side and outlet connection 56 on the core inlet side.

A thermostatically actuated valve 58 is preferably positioned in conduit 26 at or near the outlet connection 56 from the jacket for controlling the flow of liquid from the jacket to the heater core and can be operated by the heat of the liquid at this point as shown by Fig. 3 or from a remote point in the engine or heater circulating system such as shown by Fig. 1.

The electrical circuit 50 is controlled by a conventional ignition switch 60, a thermostatically actuated switch 62 located in the exhaust manifold 64 of the engine and a thermostatically actuated switch 66 located in or near the inlet connection to the liquid jacket, switches 62 and 66 being of conventional make and break design. A secondary or by-pass circuit 68 is arranged between the electromagnetic coil 46 and battery 48 controlled as by a switch mechanism 70 associated with a conventional brake pedal 72 for the vehicle.

The switch 62 is primarily required in the case of large capacity heater boosters and for most purposes can be eliminated.

In a normal operation of the heating system 18 upon the turning on of the ignition switch 60 and starting of engine 12 and assuming the liquid in the system is below a predetermined value, valve 58 remains closed inhibiting the passage of liquid from the engine circulating system to radiator core 22. Simultaneously therewith the switch 66 remains closed and switch 62 open, switch 62 thereby interrupting the flow of current from battery 48 to coil 46. By maintaining the heater booster off during the starting period as well as a few seconds after the engine has started, the possibility of imposing an extra load on the engine is eliminated. At this stage of operation wherein no eddy currents are produced between rotor 38 and drum 40, no power absorption takes place and consequently no drag or frictional heat is produced therebetween.

Immediately upon the production of heat in the exhaust manifold 64 of the engine of a predetermined valve, the switch 62 which remains normally open is actuated to closed position so as to completely close the circuit and provide for a flow of current to the electromagnetic coil. With the energization of the coil eddy currents are induced between the rotor and drum resulting in the production of electrical energy which because of the stationary condition of drum 40 is immediately converted into heat, said heat being absorbed by the liquid in the liquid jacket of the drum. After the liquid has attained a certain predetermined heat as relates to the setting of thermostatically actuated valve 58, the heater liquid is permitted to flow past the valve due to the opening of the valve in accordance with liquid temperature. The valve at this time permits only a metered flow of heated liquid so as to limit the amount of liquid flowing through the liquid jacket for its quick warm-up. After the passage of the heated liquid past valve 58 it flows through conduit 26 into the heater core for the purpose of providing a heat transfer medium for heating the air circulated thereover by air propelling fan 24.

With the continued operation of the engine and the bringing up to temperature of the liquid in the engine as controlled by a conventional thermostat 74 arranged therein the switch 66 is actuated to open position thus preventing the flow of current to the electromagnetic coil resulting in the cessation of the production of eddy currents between the rotor and drum. Simultaneously therewith, valve 58 is actuated to full open position so as to permit of the free flow of liquid from the engine circulating system into and through the heater circulating system to thereby maintain the temperature of the liquid in the heater core at a maximum.

It is to be noted from the operational recitation herein made that the heat booster serves the primary purpose of producing a limited amount of heated liquid almost instantly for delivery to the heater core for the quick supply of heated air to the passenger compartment.

As a secondary function of the heater booster, it is utilized to serve the purpose of a power absorption or braking mechanism as a complement to the conventional braking mechanism employed by the vehicle of which the heating system forms a part. The heater booster in performing its normal function as an eddy current electromagnetic power absorption mechanism is arranged so that the electromagnetic coil thereof is connected in a secondary electric circuit 68 controlled as by the conventional brake pedal 72. The pedal 72 carries a contact button 76 adapted upon predetermined movement thereof by the brake pedal to complete circuit 68 for the supply of current to the electromagnetic coil. Immediately with the production of eddy currents and the resistance to movement imposed by drum 40, the effective force of the rotor is retarded, said retardation or braking force being directly transmitted to the belt and crankshaft 44 of the engine thereby imposing a drag or braking load thereon effective to assist the conventional vehicle brakes in stopping or retarding the motion of the vehicle as the case may be.

In the utilization of the heater booster either as a heat production or power absorption mechanism it is effective to supply heat to the heater circulating system which is in turn supplied to the engine circulating system thereby maintaining the liquid therein at higher and more efficient operating temperatures so as to prevent crankcase dilution and permit of improved engine operation.

While this invention has been described in connection with certain specific embodiments, the principle involved is susceptibly of numerous other applications that will readily occur to persons skilled in the art. The invention, therefore, is limited only as indicated by the scope of the appended claims.

What I claim is:

1. A heating system for heating the passenger compartment of vehicles comprising a heater liquid circulating system interconnected with the liquid circulating system of the engine of the vehicle, means driven by the engine for heating the liquid in the heater circulating system comprising a rotary electrical power input member and a stationary electrical power absorbing member, said electrical power absorbing member having a liquid circulating tank thereon having intercommunication with the heater liquid circulating system, a heat transfer core in the heater circulating system, means associated with the core for passing air thereover, switch means in the exhaust of the engine for controlling the operation of the liquid heating means, and a second switch means in the heater liquid circulating system for also controlling the operation of the liquid heating means.

2. A heating system for vehicles comprising a heater liquid circulating system interconnected with the liquid circulating system of the vehicle engine, a heat transfer core connected in the heater circulating system, a mechanical electrical energy heat generating source for heating the liquid in the heater circulating system comprising a rotary power input member and a stationary power absorption member having a liquid circulating passage disposed therearound having intercommunication with the heater circulating system, a source of electrical excitation for the heat generating source, a thermostatically actuated switch in the heater circulating system for controlling the supply of excitation to the heat generating source, and a thermostatically actuated valve in the heater circulating system responsive to the temperature of the liquid therein for controlling the flow of liquid between the heat generating source and the heat transfer core.

3. A heating system for heating the passenger compartment of automotive vehicles comprising a heater liquid circulating system interconnected with the conventional liquid cooling circulating system of the vehicle engine between the inlet and outlet of the heat source therefor, a heat transfer core connected in the heater circulating system, an electromagetic power absorption device driven from the engine for heating the liquid in the heater circulating system, an electrical circuit supplying electrical current to the device, a pair of thermostatically actuated switches arranged in the circuit for controlling the operation of the device for power absorption and heat production one in the engine exhaust responsive to the temperature therein, and the other in the inlet of the heater liquid circulating system responsive to the temperature of the liquid therein and a thermostatically operated normally closed valve in the heater circulating system.

4. A heating system for heating the passenger compartment of vehicles comprising a heater liquid circulating system interconnected with the conventional liquid cooling circulating system of the vehicle engine, a heat transfer core connected in the heater circulating system, an electromagnetic power absorption device driven from the engine for heating the liquid in the heater circulating system, an electrical circuit supplying electrical current to the device, a thermostatically actuated switch in the exhaust of the engine responsive to the temperature therein for controlling the supply of current to the device, a thermostatically actuated switch in the inlet to heater circulating system responsive to the temperature of the liquid therein for controlling the supply of current to the device, and a thermostatically actuated valve in the heater circulating system responsive to the temperature of the liquid therein for controlling the flow of liquid between the device and core.

5. A heating system for heating the passenger compartment of vehicles comprising a heater liquid circulating system interconnected with the conventional liquid cooling circulating system of the vehicle engine, a heat transfer core connected in the heater circulating system, an air propelling means for delivering air over the core into the passenger compartment, an electromagnetic power absorption device driven from the engine for heating the liquid in the heater circulating system, an electrical circuit supplying electrical current to the device, a thermostatically actuated switch in the exhaust of the engine for controlling the supply of current to the device, a thermostatically actuated switch in the heater circulating system for controlling the supply of current to the device, a thermostatically actuated valve in the heater circulating system responsive to the temperature of the liquid therein for controlling the flow of liquid between the device and core, and a thermostatically actuated valve in the engine circulating system for controlling the flow of liquid in the engine and heater circulating system.

6. A heating system for heating the passenger compartment of vehicles having liquid cooled engines comprising a heater liquid circulating system interconnected in the circulating cooling system for the engine, a heat transfer core in the heater circulating system, an eddy current electromagnetic power absorption device driven from the engine comprising a rotor, an electromagnetic coil mounted on the rotor, a stationary drum associated therewith and a liquid jacket affixed to the drum, said jacket being connected to the heater circulating system, an electrical circuit for the coil, a source of electrical current for the circuit, a thermostatically actuated switch intermediate the circuit and exhaust pipe of the engine for controlling the circuit, a second thermostatically actuated switch intermediate the circuit and heater circulating system for controlling the circuit, and thermostatically actuated valve means for controlling the flow of liquid in the engine and heater circulating systems.

7. A heating system for heating the passenger compartment of vehicles having liquid cooled engine comprising a heater liquid criculating system interconnected in the circulating cooling system for the engine, a heat transfer core in the heater circulating system, an eddy current electromagnetic power absorption device driven from the engine comprising a rotor, an electromagnetic coil mounted on the rotor, a stationary drum associated therewith and a liquid jacket affixed to the drum, said jacket being connected to the heater circulating system, an electrical circuit for the coil, a source of electrical power for the circuit, a thermostatically actuated switch intermediate the circuit and exhaust pipe of the engine for controlling the circuit, a second thermostatically actuated switch intermediate the circuit and heater circulating system for controlling the circuit, a thermostatically actuated valve for controlling the flow of liquid in the heater circulating system, and a second thermostatically actuated valve for controlling the flow of liquid in the engine circulating system.

8. In combination with a liquid cooled internal combustion engine driven vehicle, a heating system comprising a liquid circulating system interconnected with the liquid cooling system of the engine, a heat transfer core in the circulating system, an electromagnetic combination power absorption and heat generating device associated with the liquid circulating system, an electrical circuit for the device, a second electrical circuit for the device, a common source of eletrical current for the circuits, a pair of thermostatically actuated switches in the first circuit for controlling the supply of current to the device, a thermostatically actuated normally closed valve in the liquid circulating system for the heating system responsive to the temperature of the liquid in the liquid circulating system for the heating system for controlling the flow of liquid therethrough and a switch in the second circuit controlled by movement of the vehicle brake pedal for controlling the supply of current to the device.

9. In combination with a liquid cooled internal combustion engine driven vehicle, a passenger compartment heating system comprising a liquid circulating system interconnected in the engine liquid cooling circulating system, a heat transfer core connected in the heating system circulating system, an air impelling means associated with the core for impelling air across the core, an eddy current electromagnetic mechanism comprising a rotor driven from the engine, an electromagnetic coil mounted on the rotor, and a stationary drum member associated with the rotor, said drum having a liquid jacket curcumferentially arranged thereon connected in the heating system circulating system, an electrical circuit for the coil of the mechanism, a second electrical circuit for the coil of the mechanism, a source of electrical current for both circuits, a thermostatically actuated normally closed switch positioned in the exhaust of the engine for controlling the first circuit, a thermostatically actuated normally open switch positioned in the heating system circulating system for controlling the first circuit, a thermostatically actuated normally closed valve for controlling the flow of liquid in the heating system circulating system, and normally open switch actuated by the conventional brake pedal of the vehicle for controlling the second circuit.

10. In combination with a liquid cooled internal combustion engine driven vehicle, a passenger compartment heating system comprising a liquid circulating system interconnected in the engine liquid cooling circulating system, a heat transfer core interconnected in the heating system liquid circulating system, a combination power absorption and heat generating device driven from the engine comprising a rotary power input member and a stationary power output member having a liquid conveying jacket circumferentially arranged thereon, intercommunicating with the heating system liquid circulating system, a thermostatically actuated switch responsive to the temperature of the liquid in the heating system liquid circulating system arranged therein at or near the inlet to the liquid conveying jacket for controlling the operation of the combustion device, and a thermostatically actuated valve arranged at or near the outlet of the liquid conveying jacket responsive to the temperature of the liquid in the heating system liquid circulating system for controlling the flow of liquid between the jacket and the heat transfer core.

HOWARD J. FINDLEY.

REFERENCES CITED

The following references are of record in the file of this patent:

UNITED STATES PATENTS

| Number | Name | Date |
|---|---|---|
| 1,814,744 | Ellen | July 14, 1931 |
| 1,972,353 | North et al. | Sept. 4, 1934 |
| 2,232,587 | Brandt | Feb. 18, 1941 |
| 2,332,149 | Horton | Oct. 19, 1943 |
| 2,355,484 | Teker | Aug. 8, 1944 |

FOREIGN PATENTS

| Number | Country | Date |
|---|---|---|
| 451,719 | Great Britain | Aug. 11, 1936 |